United States Patent
Siegel et al.

(10) Patent No.: US 9,767,426 B2
(45) Date of Patent: Sep. 19, 2017

(54) TRANSLATION OF DESTINATION IDENTIFIERS

(71) Applicants: Amazon Technologies, Inc., Seattle, WA (US); IMDb.com, Inc., Seattle, WA (US)

(72) Inventors: Hilliard Bruce Siegel, Seattle, WA (US); Kenneth Thomas Burford, Seattle, WA (US)

(73) Assignees: Amazon Technologies, Inc., Seattle, WA (US); IMDb.com, Inc., Seattle, WA (US)

(*) Notice: Subject to any disclaimer, the term of this patent is extended or adjusted under 35 U.S.C. 154(b) by 0 days.

(21) Appl. No.: 15/238,226

(22) Filed: Aug. 16, 2016

(65) Prior Publication Data
US 2016/0358118 A1    Dec. 8, 2016

Related U.S. Application Data

(62) Division of application No. 14/482,928, filed on Sep. 10, 2014, now Pat. No. 9,424,548.

(51) Int. Cl.
| G06K 19/00 | (2006.01) |
| G06Q 10/08 | (2012.01) |
| G06K 7/14 | (2006.01) |

(52) U.S. Cl.
CPC ......... *G06Q 10/083* (2013.01); *G06K 7/1413* (2013.01); *G06K 7/1417* (2013.01); *G06Q 10/08355* (2013.01)

(58) Field of Classification Search
USPC .............................. 235/435, 439, 454, 462
See application file for complete search history.

(56) References Cited

U.S. PATENT DOCUMENTS

| 9,424,548 | B1* | 8/2016 | Siegel | G06Q 10/08355 |
| 2005/0171738 | A1* | 8/2005 | Kadaba | G06K 19/0717 |
| | | | | 702/187 |
| 2006/0282277 | A1* | 12/2006 | Ng | G06Q 10/08 |
| | | | | 705/333 |
| 2008/0169346 | A1 | 7/2008 | Schad et al. | |
| 2011/0215146 | A1* | 9/2011 | Shams | G06F 17/00 |
| | | | | 235/383 |

* cited by examiner

*Primary Examiner* — Matthew Mikels
(74) *Attorney, Agent, or Firm* — Thomas | Horstemeyer, LLP (57) ABSTRACT

Disclosed are various embodiments for translation of destination identifiers. In one embodiment, a destination identifier applied to a shipment is scanned. The destination identifier is translated to a first shipping address based at least in part on a mapping of destination identifiers to shipping addresses. The shipment is routed for delivery to the first shipping address. The destination identifier is then translated to a second shipping address based at least in part on the mapping. The shipment is then rerouted to the second shipping address.

20 Claims, 7 Drawing Sheets

TRANSLATION OF DESTINATION IDENTIFIERS

CROSS-REFERENCE TO RELATED APPLICATIONS

This application is a divisional of, and claims priority to, co-pending U.S. Patent Application entitled "TRANSLATION OF DESTINATION IDENTIFIERS," filed on Sep. 10, 2014, and assigned U.S. application Ser. No. 14/482,928, which is incorporated herein by reference in its entirety.

BACKGROUND

In order to send mail, packages, and/or other packages to a person or other entity, senders specify a destination address. Typically, a destination address will include a recipient's name, a street address (e.g., street number and street name), an internal address (e.g., "Suite 501," "Apt. B22," etc.), a city name, a state or province name, a postal code, a country, and/or other information. In some cases, Post Office box numbers may be used in place of geographic addresses. Senders also may provide a return address with a sender's name, a street address, an internal address, a city name, a state or province name, a postal code, a country, and/or other information. Various rules promulgated by shipping carriers may govern how shipments are to be addressed for delivery via a particular shipping carrier.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to translation of destination identifiers in order to replace the use of traditional destination addresses for addressing mail and other shipments. Traditional destination addresses have many drawbacks. To begin with, traditional destination addresses are long and unwieldy to write and remember. Transcription errors (e.g., a transposition of a single digit in the street address number) may result in incorrect delivery and/or returning the shipment to the sender. Traditional destination addresses are not bound to the recipient, so it may be that the recipient has moved or otherwise cannot take delivery at a given destination address for which a shipment is addressed. In addition, traditional destination addresses lack privacy features, as anyone who looks at a parcel may be able to determine the recipient for whom it is addressed.

Various embodiments of the present disclosure introduce a more user-friendly approach to addressing mail and/or other shipments. Destination identifiers are used in place of traditional destination addresses when addressing mail and/or other shipments. The destination identifiers may be registered with a central entity by users, and shipping carriers may be granted access to translate given destination identifiers to addresses. The registration of a destination identifier may be updated dynamically such that shipments will be delivered to a current location of the intended recipient. In various embodiments, the destination identifier may be encoded so as to detect transcription errors, e.g., using a checksum. Also, in one embodiment, the destination identifier may exclude any personally identifiable information to enhance privacy.

Figure 1:
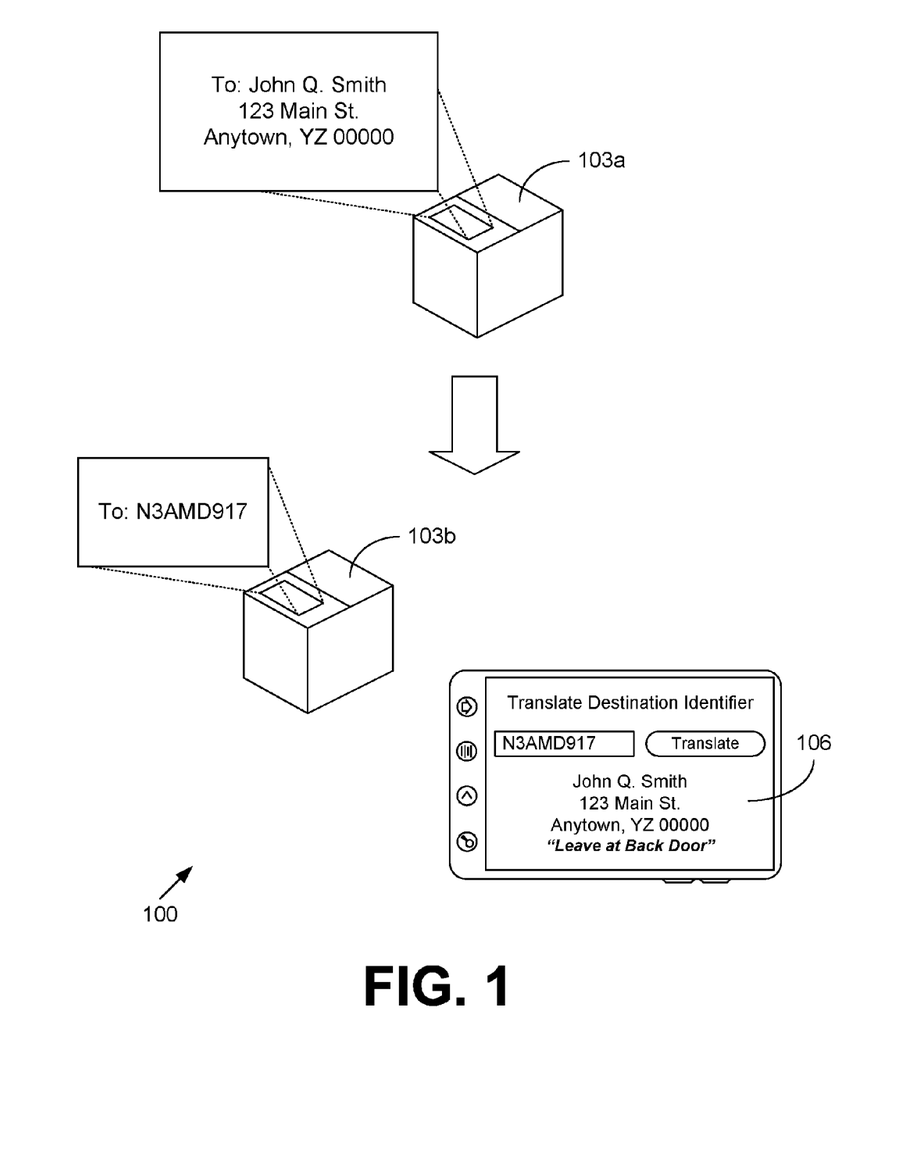
FIG. 1 is a diagram of an example scenario involving translation of destination identifiers.

With reference to FIG. 1, shown is a diagram of an example scenario 100 involving translation of destination identifiers. Traditionally, a shipment 103a would be addressed with a full shipping address specifying, for example, a recipient name, a street address, a city, a state, and a postal code. In this scenario 100, a shipment 103a is addressed in this way, with a shipment label affixed to the exterior of the shipment 103a and bearing the shipping address of "John Q. Smith, 123 Main St., Anytown, YZ 00000." The shipping address may be machine printed or handwritten. Other routing identifiers may be present on the shipment 103a, such as bar codes, quick response (QR) codes, radio-frequency (RF) identifiers, magnetic identifiers, and so on, but the initial application of the shipping address may determine any subsequent application of routing identifiers.

Under the principles of the present disclosure, the shipment 103b, by contrast, is addressed using a destination identifier in place of a shipping address. That is to say, rather than bearing the shipping address of "John Q. Smith, 123 Main St., Anytown, YZ 00000," the shipping label of the shipment 103b instead states "N3AMD917." This corresponds to the destination identifier in one embodiment. The destination identifier may be machine printed or handwritten. Through the use of the destination identifier, a sender does not need to know the actual shipping address of the recipient, and the actual shipping address may even change during transit. The destination identifier may be easier to write, consuming fewer characters than the shipping address. Moreover, the destination identifier may be encoded with a checksum or another error detection code to enable determining whether the destination identifier is valid.

In this scenario 100, a user interface 106 is rendered by a client device to facilitate translation of the destination identifier to a shipping address. As shown, the destination identifier "N3AMD917" may be entered into the user interface 106 and translated into the shipping address of "John Q. Smith, 123 Main St., Anytown, YZ 00000." In some cases, other types of delivery instructions may be used to supplement, or in place of, an actual shipping address (e.g., "Main St.—Third House on Left"). In addition, a special delivery instruction of "Leave at Back Door" may be supplied based upon the application of one or more rules. A delivery agent may use the user interface 106 in order to determine where the shipment 103 should be delivered. As a non-limiting example, a rule may specify that deliveries during the daytime are to go to the back door, while deliveries during the evening are to go to the front door. A late binding approach may be used such that the shipping address, the delivery instructions, etc., that are associated with the destination identifier may be updated while the shipment 103b is in transit.

In the following discussion, a general description of the system and its components is provided, followed by a discussion of the operation of the same.

Figure 2:
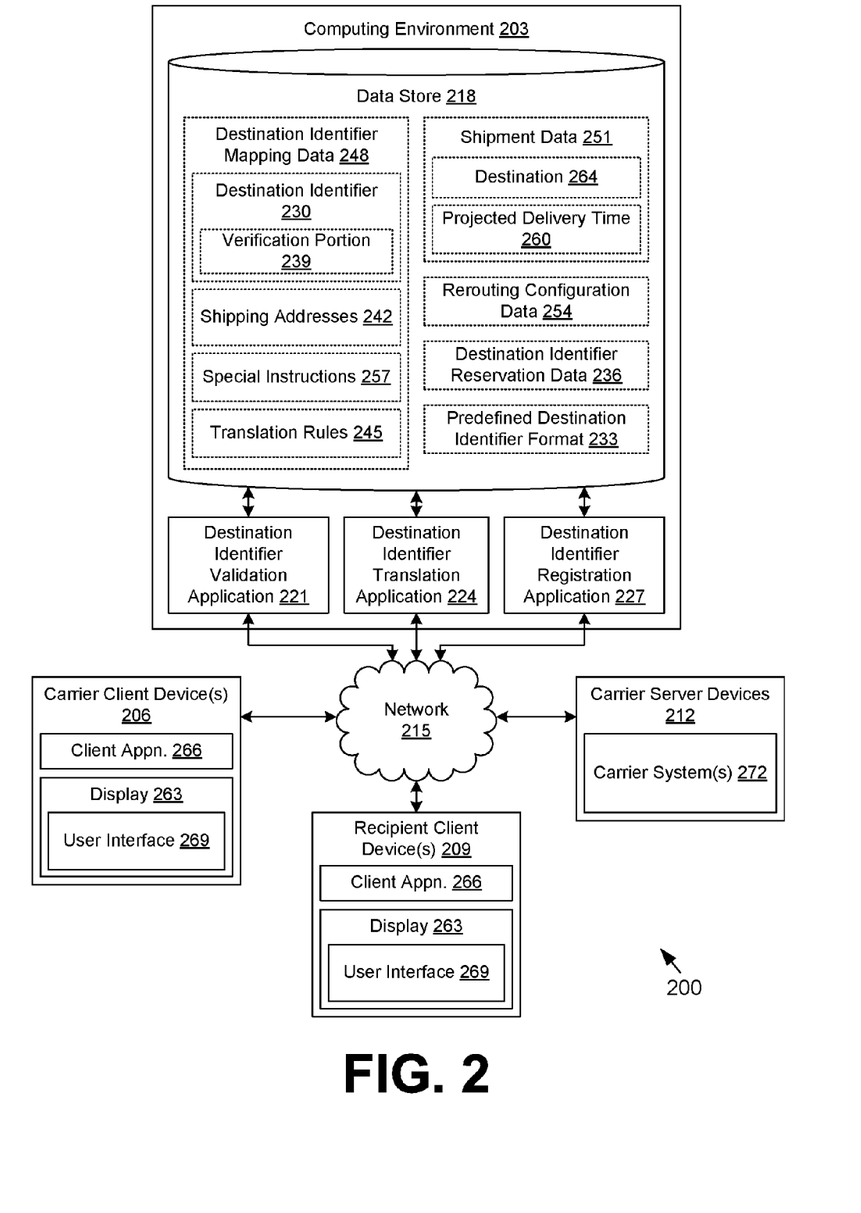
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more carrier client devices 206, one or more recipient client devices 209, and one or more carrier server devices 212, which may be in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 218 that is accessible to the computing environment 203. The data store 218 may be representative of a plurality of data stores 218 as can be appreciated. The data stored in the data store 218, for example, is associated with the operation of the various applications and/or functional entities described below.

The components executed on the computing environment 203, for example, include a destination identifier validation application 221, a destination identifier translation application 224, a destination identifier registration application 227, and other applications, services, processes, systems, engines, or functionality not discussed in detail herein. The destination identifier validation application 221 is executed to validate destination identifiers 230. Specifically, the destination identifier validation application 221 is executed to receive a destination identifier 230 and determine whether the received destination identifier 230 constitutes a valid identifier.

In one embodiment, the destination identifier validation application 221 may determine whether the destination identifier 230 complies with rules associated with a predefined destination identifier format 233. In another embodiment, the destination identifier validation application 221 determines whether the destination identifier 230 corresponds to a validly reserved destination identifier 230 according to destination identifier reservation data 236. In still another embodiment, the destination identifier validation application 221 determines whether a destination identifier 230 is valid based at least in part on a verification portion 239 included within the destination identifier 230. Although some implementations of the destination identifier validation application 221 may be server-based, it is understood that certain implementations of the destination identifier validation application 221 may be implemented in a carrier client device 206, a carrier server device 212, or another computing device. For example, when verifying the destination identifier 230 using a self-contained verification portion 239 of the destination identifier 230, communication with the computing environment 203 may be unnecessary.

The destination identifier translation application 224 is executed to translate a destination identifier 230 into a shipping address 242. The translation may depend on various translation rules 245 specified for a given destination identifier 230. It is noted that the translation may be of a dynamic nature, such that the associated shipping address 242 may change from time to time, and potentially while a shipment 103 (FIG. 1) is in transit with a shipping carrier.

The destination identifier registration application 227 is executed to facilitate registration of destination identifiers 230. In some cases, the registration is directly by recipients via recipient client devices 209, while in other cases, the registration may be performed on behalf of recipients automatically or by agents permitted to access the computing environment 203 and modify registration of destination identifiers 230. In some embodiments, the destination identifier registration application 227 includes functionality configured to automatically generate a unique destination identifier 230 for assignment to a recipient. In other embodiments, the destination identifier registration application 227 includes functionality to permit registration of user-specified strings as destination identifiers 230. In the latter scenario, the destination identifier registration application 227 may perform a check to ensure that the proposed destination identifier 230 specified by a user is not previously registered or meets various requirements.

The data stored in the data store 218 includes, for example, destination identifier mapping data 248, shipment data 251, rerouting configuration data 254, destination identifier reservation data 236, a predefined destination identifier format 233, and potentially other data. The destination identifier mapping data 248 corresponds to a stored mapping between destination identifiers 230 and shipping addresses 242. To this end, the destination identifier mapping data 248 may include destination identifiers 230, shipping addresses 242, special instructions 257, translation rules 245, and/or other data.

Each destination identifier 230 may correspond to a single intended recipient, e.g., a person, a business, an organization, etc. The destination identifiers 230 may respectively correspond to a globally unique string of characters. Various letters, numbers, and special characters from one or more character sets may be used in various scenarios. In one embodiment, the destination identifiers 230 are automatically generated at least in part on a random basis. For example, the destination identifiers 230 may be the result of a hash function applied to one or more data items of the shipping addresses 242 or other identifying information of the recipient. In another embodiment, a user may specify a desired destination identifier 230 and register it if available. In such a case, the destination identifier 230 may be hierarchically structured similarly to the Domain Name System (DNS).

In various embodiments, the destination identifiers 230 may be created with a verification portion 239 integral to the destination identifier 230. For example, the verification portion 239 may comprise a checksum, a check digit, or other data that may be used to verify the integrity of the destination identifier 230. Approaches such as the Luhn algorithm may be used in conjunction with the verification portion 239 to determine whether the destination identifier 230 is in the valid format and does not have an erroneous digit or other character. Where the destination identifier 230 is constructed from a human-meaningful name, the verification portion 239 may also be human meaningful. For example, where "JohnSmith" is a base portion of the destination identifier 230, a verification portion 239 of ".penguin" may be added, for a complete destination identifier 230 of "JohnSmith.penguin." In an embodiment involving human-meaningful names, a non-human-meaningful checksum or hash may be added. For example, ".D8" may correspond to a two-character hash for "JohnSmith," giving a complete destination identifier 230 of "JohnSmith.D8."

In some embodiments, a single recipient may have multiple destination identifiers 230, e.g., "JohnSmith662.home," "JohnSmith662.work," and so on. Also, a destination identifier 230 may resolve to another destination identifier 230. For example, a destination identifier 230 of "JohnSmith662" may be mapped to a destination identifier 230 of "JohnSmith662.home" based at least in part on the translation rules 245.

The shipping addresses 242 may correspond to geographic addresses or locations to which shipments 103 may be delivered. In one example, a shipping address 242 may correspond to a recipient's name and street address. Internal addressing may also be used to specify suite number, unit number, delivery drop-off location, and so on. In another example, a shipping address 242 may correspond to a mailbox number, such as a Post Office box number. In yet another example, a shipping address 242 may correspond to a set of geographic coordinates (e.g., latitude and longitude). For example, the shipping address 242 may be generated via automated location-based routing using a location of a smartphone or other location-tracking device. It is noted that multiple shipping addresses 242 may be associated with a single destination identifier 230.

The special instructions 257 may comprise any additional delivery or handling instructions that pertain to a particular destination identifier 230. For example, the special instructions 257 may direct a delivery person to ring a doorbell twice, leave a package in a particular area outside, leave a package with a particular person, and so on.

The translation rules 245 govern which of shipping addresses 242 will be selected for a given shipment 103. One or more translation rules 245 may specify that the selected shipping address 242 depends on the projected delivery time 260 of the shipment 103. As an example, packages arriving during working hours may be routed to a work shipping address 242, while packages arriving outside of working hours may be routed to a home shipping address 242. As another example, packages arriving during a specified time period corresponding to a summer break may be routed to a home shipping address 242, while packages arriving while school is in session may be routed to a school shipping address 242. The translation rules 245 may also depend on the type of shipment 103, including characteristics such as, for example, size, weight, value, fragility, and so on. For example, shipped items that are especially fragile or valuable may be shipped to one shipping address 242, while all other items may be shipped to a default shipping address 242. In another scenario, a recipient may provide several equally acceptable shipping addresses 242, with one of them being selected based upon lowest cost to the sender and/or recipient.

The shipment data 251 may include various data regarding shipments 103, such as a destination 264 and a projected delivery time 260. The shipment data 251 may specify various characteristics about a shipment 103, such as service level (next day, second day, first class, etc.), size, weight, value, fragility, hazardous material classification, delivery attempt information, and so on. Although the data store 218 is shown including the shipment data 251, in other embodiments, the data store 218 may not store carrier-specific or shipment-specific data. For example, any shipment-specific data may be provided to the destination identifier translation application 224 via a service call.

The destination 264 associated with the shipment 103 may correspond to a particular destination identifier 230 with which the shipment 103 is associated. For example, the destination identifier 230 may be written on the exterior of the shipment 103 or may be printed or written on a label affixed to the exterior of the shipment 103. The projected delivery time 260 may indicate when the shipment 103 is projected to be delivered. It is noted that the projected delivery time 260 may change dynamically in regard to processing load in materials handling facilities, traffic, weather conditions, and/or other factors. The projected delivery time 260 may also change in response to a change in the shipping address 242 into which the destination identifier 230 for the destination 264 is translated.

The rerouting configuration data 254 may govern under what circumstances a shipment 103 may be rerouted from one shipping address 242 to another shipping address 242 upon a dynamic update of the destination identifier 230. For example, if a shipment 103 has just been picked up by the carrier, it may be inconsequential to reroute the shipment 103 to a different shipping address 242. By contrast, if a shipment 103 is on the last mile of a delivery to a shipping address 242 in Florida and the shipping address 242 changes to a location in California, it may be costly to reroute the shipment 103, potentially both for cost and for time in transit. However, if a shipment 103 is on the last mile of a delivery to a shipping address 242, and the shipping address 242 changes to another house in the same neighborhood, rerouting may be trivial. The rerouting configuration data 254 may indicate tolerances as to cost and delivery time that the shipper, recipient, and/or the carrier are willing to bear due to rerouting.

In some embodiments, the destination identifier reservation data 236 corresponds to a catalog of all of the destination identifiers 230 that have been registered and/or reserved via the destination identifier registration application 227. The predefined destination identifier format 233 may govern the acceptability of user-specified destination identifiers 230 as to character set(s), length, acceptable and unacceptable character combinations, and so on.

The carrier client devices 206 and the recipient client devices 209 are each representative of a plurality of client devices that may be coupled to the network 215. The carrier client devices 206 and the recipient client devices 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each of the carrier client devices 206 and the recipient client devices 209 may include a display 263. The display 263 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The carrier client devices 206 and the recipient client devices 209 may be configured to execute various applications such as a client application 266 and/or other applications. The client application 266 may be executed in the carrier client device 206 and/or the recipient client device 209 for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. The carrier client devices 206 and the recipient client devices 209 may be configured to execute applications beyond the client application 266 such as, for example, email applications, social networking applications, word processors, spreadsheets, and/or other applications.

The carrier client devices 206 correspond to client devices operated by agents affiliated with a carrier. Such agents may scan shipments 103 and route them to various destinations 264. Such agents may move shipments 103 from one area to another in a materials handling facility or from one piece of equipment (e.g., a conveyor belt) to another. Such agents may also include workers who load shipments 103 onto delivery vehicles, delivery agents who carry out the deliveries, and others.

The recipient client devices 209 correspond to client devices operated by recipients or potential recipients. The recipient client devices 209 may be used to register a new destination identifier 230, check the status of a shipment 103, to add or update shipping addresses 242, special instructions 257, or translation rules 245, and/or to update other data.

The carrier server devices 212 may comprise, for example, a server computer or any other system providing computing capability. Alternatively, the carrier server devices 212 may employ a plurality of computing devices that may be arranged, for example, in one or more server banks, computer banks, or other arrangements. Such computing devices may be located in a single installation or may be distributed among many different geographical locations. For example, the carrier server devices 212 may include a plurality of computing devices that together may comprise a hosted or "cloud" computing resource, a grid computing resource, and/or any other distributed computing arrangement. In some cases, the carrier server devices 212 may correspond to an elastic computing resource where the allotted capacity of processing, network, storage, or other computing-related resources may vary over time.

Various applications and/or other functionality may be executed in the carrier server devices 212 according to various embodiments. Also, various data may be stored in a data store that is accessible to the carrier server devices 212. Primarily, for the purposes of the present disclosure, the carrier server devices 212 are employed to execute one or more carrier systems 272. The carrier systems 272 may be executed to provide updates to shipment data 251, receive information regarding new shipments 103 and pick-ups, provide information regarding deliveries, request translations between destination identifiers 230 and shipping addresses 242, and/or perform other actions.

Next, a general description of the operation of the various components of the networked environment 200 is provided. To begin, the computing environment 203 is established by a provider of destination identifier translation services. For example, the destination identifier translation services may be provided by a government agency, a quasi-governmental entity, a Post Office or other shipping carrier, a retailer or other business entity, a nonprofit, and/or other entities that are trusted to provide destination identifier translation services. It is noted that the destination identifier translation services may be provided for use by multiple carriers.

Via the recipient client devices 209, potential recipients may register their destination identifiers 230 via the destination identifier registration application 227. The potential recipients may choose their destination identifiers 230 or they may be assigned automatically. The potential recipients may also provide shipping addresses 242, special instructions 257, translation rules 245, and/or other data. Where the destination identifier translation services are provided at a charge, the potential recipient may provide payment information. In some cases, destination identifiers 230 may be assigned automatically without a request from a recipient client device 209, and potential recipients may be informed of their assigned destination identifiers 230 by way of email, telephone call, text message, letter, or other form of communication.

The potential recipients may communicate their destination identifier 230 to potential senders. Alternatively, the potential senders may discover destination identifiers 230 for recipients via destination identifier directory services. As yet another alternative, the destination identifiers 230 may be assigned from existing globally unique identifiers that are known to the senders (e.g., based on Social Security numbers, telephone numbers, email addresses, etc.).

A sender then sends a shipment 103 to a recipient. Rather than specifying a shipping address 242, the sender instead specifies the destination identifier 230 for the recipient. For example, the sender may write the destination identifier 230 on the exterior of the shipment 103, or the sender may print or write upon a label to be affixed to the exterior of the shipment 103. The shipment 103 may comprise a letter, package, parcel, or any other item shippable by a carrier.

The carrier then receives the shipment 103 and performs initial processing. Such processing may be performed by a person using a carrier client device 206 or via a machine in communication with a carrier system 272. As part of the processing, the destination identifier 230 upon the exterior of the shipment 103 may be optically scanned and recognized. Alternatively, an agent may manually type in the destination identifier 230 via a user interface 269. When the destination identifier 230 is received, an initial verification or validation may be performed via the verification portion 239 of the destination identifier 230 using the destination identifier validation application 221. If the destination identifier 230 is invalid, the shipment 103 may be rejected. For example, an audible alarm may sound, a vibration may be generated, or a visual indication may be rendered by the carrier client device 206.

If the destination identifier 230 is valid, the carrier client device 206 and/or the carrier system 272 may request a translation of the destination identifier 230 into a shipping address 242 via a service call to the destination identifier translation application 224. In some embodiments, the service call may specify information knowable only by the carrier, such as the projected delivery time 260, rerouting configuration data 254, and/or other information.

The destination identifier translation application 224 then performs the translation of the destination identifier 230 into a shipping address 242. In some cases, the destination identifier translation application 224 may call the destination identifier validation application 221 to perform the initial validation. By applying various inputs (e.g., current time, projected delivery time 260, shipping cost, and/or other factors) to the translation rules 245, the destination identifier translation application 224 is able to resolve a single shipping address 242 and potentially special instructions 257. The shipping address 242 and special instructions 257 are then returned in response to the service call. The carrier, via an agent or an automated system, is then able to make a decision as to how to route the shipment 103 for transit and delivery to the shipping address 242.

Periodically, or in response to various events, the carrier client devices 206 and/or the carrier systems 272 may request an update to the translation from the destination identifier translation application 224. Alternatively, the destination identifier translation application 224 may push out an update when a change to the translation occurs. For example, a recipient may update the translation rules 245, the shipping addresses 242, and/or the special instructions 257 via the destination identifier registration application 227 while the shipment 103 is in transit. Alternatively, other data underlying the translation, e.g., the projected delivery time 260, may be updated, thereby causing a change to the translation.

Upon an update to the translation, the carrier may decide whether to reroute the shipment 103 based upon the rerouting configuration data 254. Rerouting may be impractical or costly. Nonetheless, the sender or the recipient may be willing to pay for the rerouting in some cases.

Ultimately, the shipment 103 is delivered to a shipping address 242 by the carrier. Recipients may recognize the destination identifier 230 on the shipment 103 as their own. Alternatively, the shipment 103 may specify a recipient's name in addition to the destination identifier 230, although doing so may sacrifice some privacy.

Figure 3:
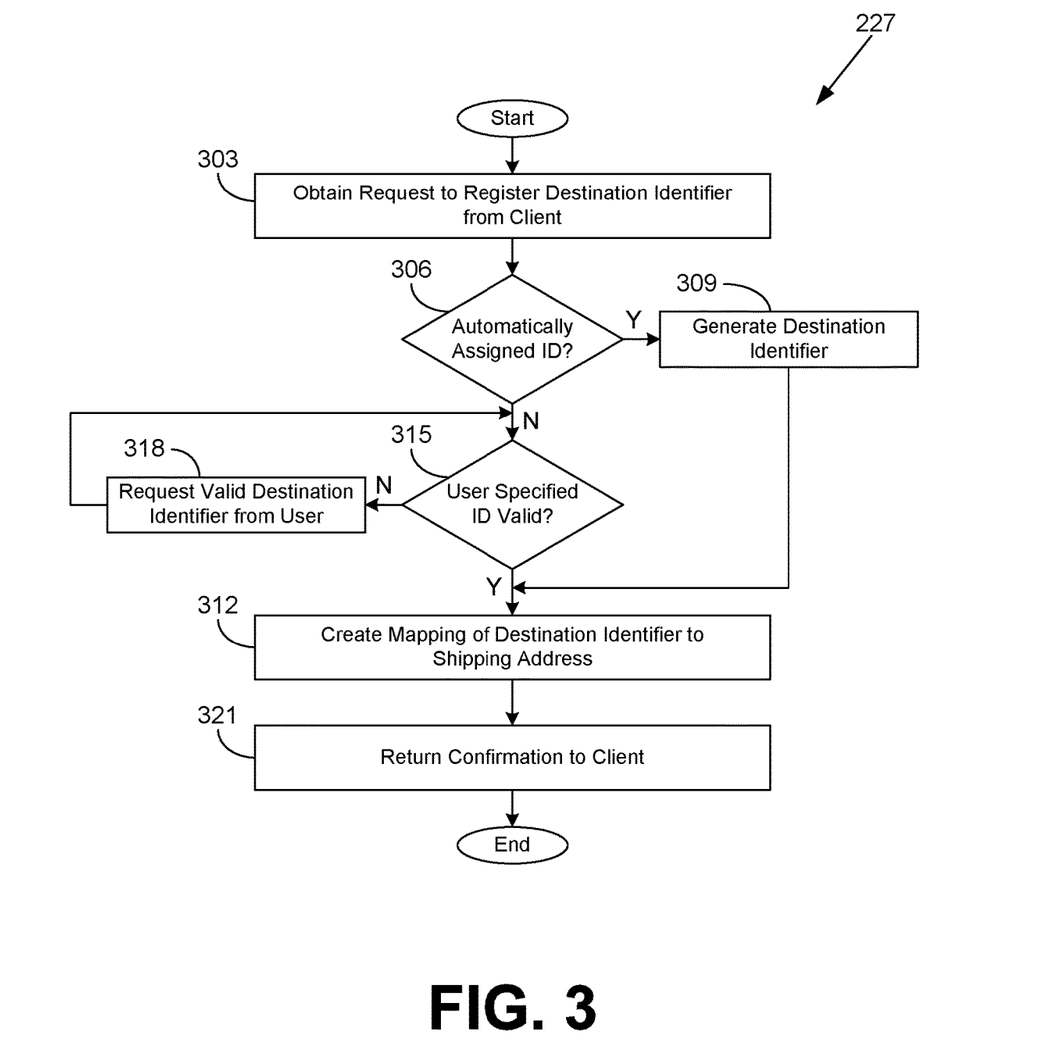
FIG. 3 is a flowchart illustrating one example of functionality implemented as portions of a destination identifier registration application executed in a computing environment in the networked environment of FIG. 2 according to various embodiments of the present disclosure.

Referring next to FIG. 3, shown is a flowchart that provides one example of the operation of a portion of the destination identifier registration application 227 according to various embodiments. It is understood that the flowchart of FIG. 3 provides merely an example of the many different types of functional arrangements that may be employed to implement the operation of the portion of the destination identifier registration application 227 as described herein. As an alternative, the flowchart of FIG. 3 may be viewed as depicting an example of elements of a method implemented in the computing environment 203 (FIG. 2) according to one or more embodiments.

Beginning with box 303, the destination identifier registration application 227 obtains a request to register a destination identifier 230 (FIG. 2) from a recipient client device 209 (FIG. 2). For example, a user may fill out a request form via a client application 266 (FIG. 2). The request may specify one or more shipping addresses 242 (FIG. 2), special instructions 257 (FIG. 2), translation rules 245 (FIG. 2), and/or other information. Alternatively, additional information may be obtained from the recipient client device 209 after a destination identifier 230 has been assigned.

In box 306, the destination identifier registration application 227 determines whether an automatically generated destination identifier 230 is to be assigned. If so, the destination identifier registration application 227 moves to box 309 and automatically generates a destination identifier 230 that may be globally unique. For example, the destination identifier registration application 227 may apply a hash function or other function to data provided by the recipient client device 209 (e.g., portions of a shipping address 242) to generate at least a portion of the destination identifier 230.

The destination identifier 230 may be generated at least partly on a randomized basis and may correspond to a randomized string of characters. In such a case, the destination identifier 230 may exclude personally identifiable information of a recipient, such as name, street address, and so on. In some embodiments, a verification portion 239 (FIG. 2) is also generated to be included in (e.g., appended to, prepended to, etc.) the destination identifier 230. The destination identifier registration application 227 then continues to box 312.

If the destination identifier 230 is not to be automatically assigned, the destination identifier registration application 227 instead continues to box 315. In box 315, the destination identifier registration application 227 determines whether a destination identifier 230 specified by a user is valid and can be registered. For example, the destination identifier registration application 227 may consult the destination identifier reservation data 236 (FIG. 2) to ensure that the proposed destination identifier 230 has not been previously reserved for another user. Further, the destination identifier registration application 227 may refer to the predefined destination identifier format 233 (FIG. 2) to ensure that the proposed destination identifier 230 complies with the predefined destination identifier format 233 (e.g., does not exceed a maximum length, is at least a minimum length, includes required characters, excludes disallowed characters, etc.).

If the proposed destination identifier 230 is not valid, the destination identifier registration application 227 requests a valid destination identifier 230 from the user in box 318. For example, the destination identifier registration application 227 may send a network page or other notification to the user identifying the problems associated with the proposed destination identifier 230. The destination identifier registration application 227 then returns to box 315 and checks an updated destination identifier 230 received from the user. If the destination identifier registration application 227 determines that the user-specified destination identifier 230 is valid, the destination identifier registration application 227 continues to box 312.

In box 312, the destination identifier registration application 227 creates a mapping of the destination identifier 230 to one or more shipping addresses 242 in the data store 218 (FIG. 2). Thus, the destination identifier mapping data 248 (FIG. 2) may be updated with the destination identifier 230, the shipping addresses 242, special instructions 257 and translation rules 245. A reservation indication for the destination identifier 230 may be added to the destination identifier reservation data 236. In box 321, the destination identifier registration application 227 returns a confirmation of the successful registration to the recipient client device 209. Thereafter, the portion of the destination identifier registration application 227 ends.

After the destination identifier 230 is registered, it is noted that a user may return to update the destination identifier mapping data 248 to change the shipping addresses 242, special instructions 257, translation rules 245, and so on.

Figure 4:
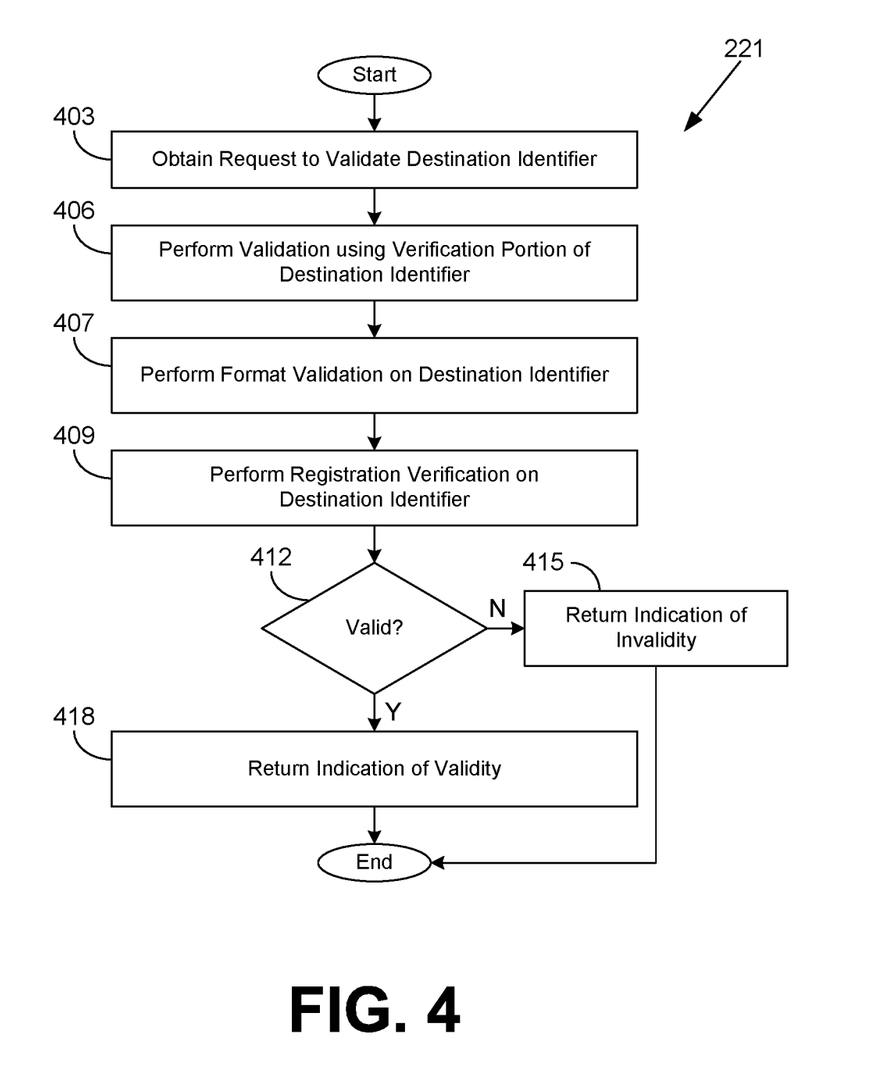
FIG. 4 is a flowchart illustrating one example of functionality implemented as portions of a destination identifier validation application executed in a computing environment in the networked environment of FIG. 2 according to various embodiments of the present disclosure.

Turning now to FIG. 4, shown is a flowchart that provides one example of the operation of a portion of the destination identifier validation application 221 according to various embodiments. It is understood that the flowchart of FIG. 4 provides merely an example of the many different types of functional arrangements that may be employed to implement the operation of the portion of the destination identifier validation application 221 as described herein. As an alternative, the flowchart of FIG. 4 may be viewed as depicting an example of elements of a method implemented in the computing environment 203 (FIG. 2) according to one or more embodiments.

Beginning with box 403, the destination identifier validation application 221 obtains a request to validate a destination identifier 230 (FIG. 2). For example, the request may originate from a client application 266 (FIG. 2) executed by a carrier client device 206 (FIG. 2) or by a carrier system 272 (FIG. 2). In box 406, the destination identifier validation application 221 performs a validation using a verification portion 239 (FIG. 2) of the destination identifier 230. For example, the destination identifier validation application 221 may apply a verification algorithm to a first portion of the destination identifier 230 and compare a result of the verification algorithm to a second portion of the destination identifier 230.

In box 407, the destination identifier validation application 221 may perform a format verification on the destination identifier 230 to confirm that the destination identifier 230 complies with a required format in the predefined destination identifier format 233 (FIG. 2). In box 409, the destination identifier validation application 221 may perform a registration verification upon the destination identifier 230 to determine whether the destination identifier 230 is validly registered in the destination identifier reservation data 236 (FIG. 2).

Based upon the results of any or all of the foregoing checks, the destination identifier validation application 221 concludes whether the destination identifier 230 is valid in box 412. If the destination identifier 230 is not valid, the destination identifier validation application 221 returns an indication of invalidity in box 415. If the destination identifier 230 is valid, the destination identifier validation application 221 returns an indication of validity in box 418. Thereafter, the portion of the destination identifier validation application 221 ends.

Figure 5:
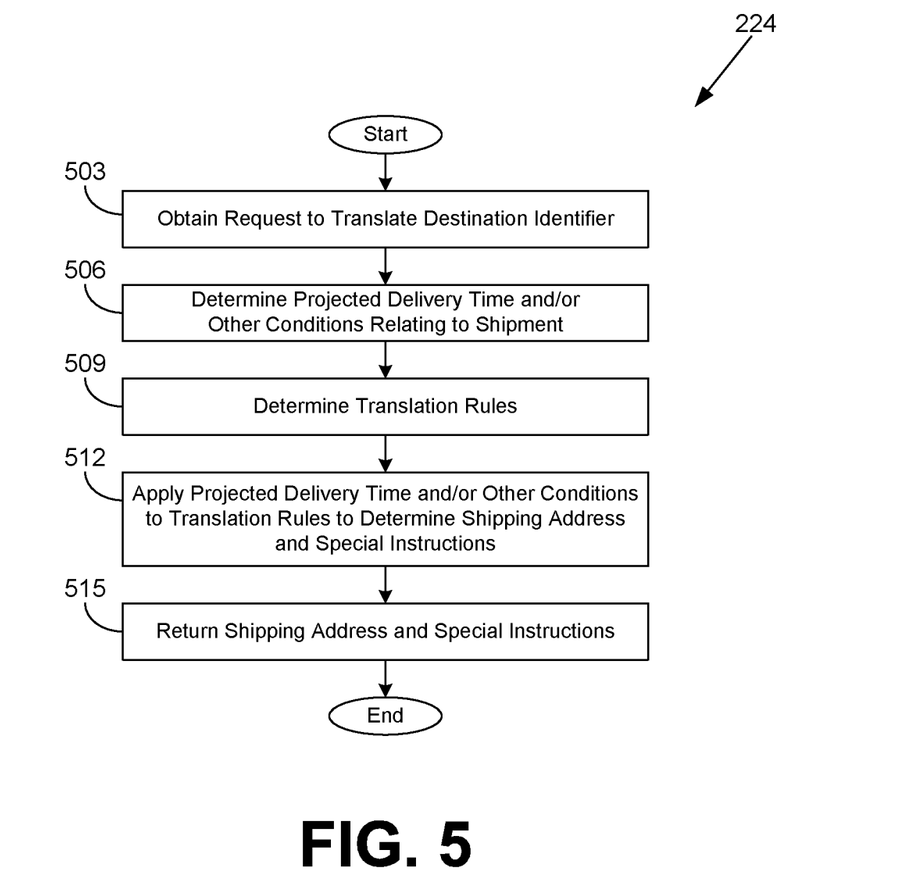
FIG. 5 is a flowchart illustrating one example of functionality implemented as portions of a destination identifier translation application executed in a computing environment in the networked environment of FIG. 2 according to various embodiments of the present disclosure.

Moving on to FIG. 5, shown is a flowchart that provides one example of the operation of a portion of the destination identifier translation application 224 according to various embodiments. It is understood that the flowchart of FIG. 5 provides merely an example of the many different types of functional arrangements that may be employed to implement the operation of the portion of the destination identifier translation application 224 as described herein. As an alternative, the flowchart of FIG. 5 may be viewed as depicting an example of elements of a method implemented in the computing environment 203 (FIG. 2) according to one or more embodiments.

Beginning with box 503, the destination identifier translation application 224 obtains a request to translate a particular destination identifier 230 (FIG. 2). For example, a user may enter the destination identifier 230 via a user interface 269 (FIG. 2) or the destination identifier 230 may be optically scanned from an exterior of a shipment 103 (FIG. 1). In box 506, the destination identifier translation application 224 determines a projected delivery time 260 (FIG. 2) and/or other conditions relating to the shipment 103 from the shipment data 251 (FIG. 2) or as specified in the translation request. In box 509, the destination identifier translation application 224 determines one or more translation rules 245 (FIG. 2) associated with the destination identifier 230.

In box 512, the destination identifier translation application 224 applies the projected delivery time 260 and/or the other conditions to the translation rules 245 in order to determine a shipping address 242 (FIG. 2) and, potentially, any special instructions 257 (FIG. 2) that may apply. In box 515, the destination identifier translation application 224 returns the shipping address 242 and the special instructions 257. A client application 266 (FIG. 2) may then receive the shipping address 242 and the special instructions 257 and render them in a user interface 269 (FIG. 2). Thereafter, the portion of the destination identifier translation application 224 ends.

Upon receiving the shipping address 242 and the special instructions 257, a carrier system 272 (FIG. 2) may initiate one or more actions to route a shipment 103 to its destination. For example, the carrier system 272 may instruct personnel to place the shipment 103 in a certain area of a facility or upon a certain vehicle, or the carrier system 272 may instruct various automated handling systems as to routing of the shipment 103. In some cases, the carrier client device 206 may determine a starting location for a delivery vehicle, determine one or more direction instructions for driving from the starting location to the shipping address 242, and present one or more direction instructions in a user interface 269.

Figure 6:
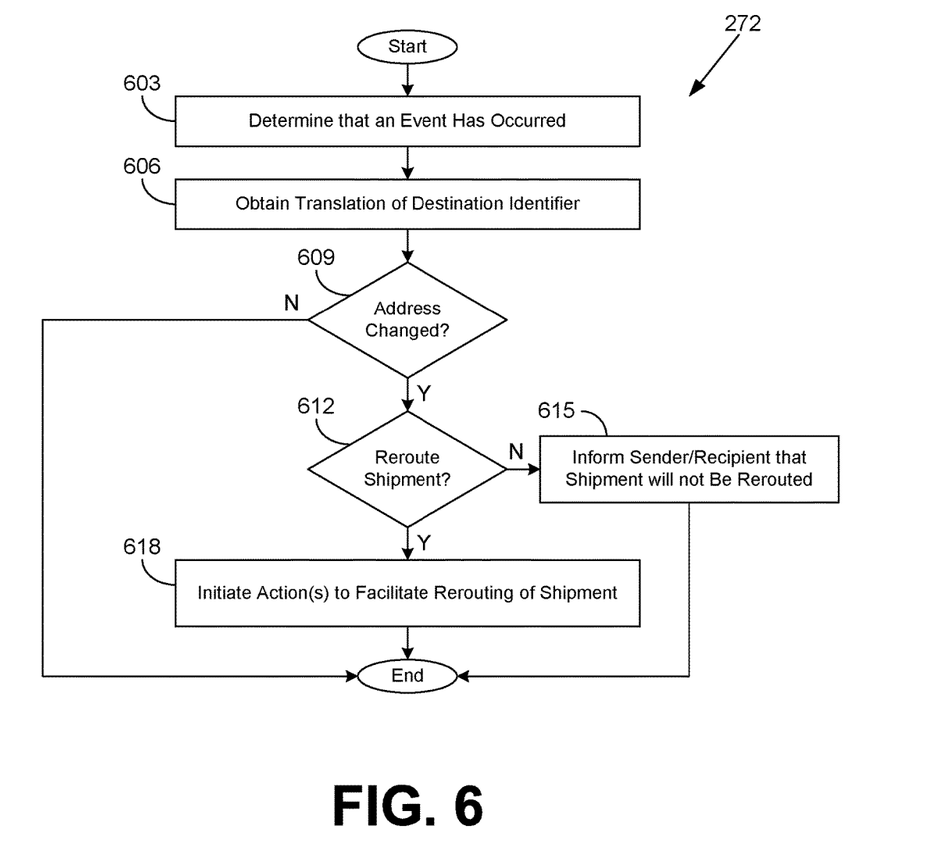
FIG. 6 is a flowchart illustrating one example of functionality implemented as portions of a carrier system executed in a carrier server device in the networked environment of FIG. 2 according to various embodiments of the present disclosure.

Continuing now to FIG. 6, shown is a flowchart that provides one example of the operation of a portion of the carrier system 272 according to various embodiments. It is understood that the flowchart of FIG. 6 provides merely an example of the many different types of functional arrangements that may be employed to implement the operation of the portion of the carrier system 272 as described herein. As an alternative, the flowchart of FIG. 6 may be viewed as depicting an example of elements of a method implemented in the carrier server devices 212 (FIG. 2) according to one or more embodiments.

Beginning with box 603, the carrier system 272 determines that an event has occurred. For example, a shipment 103 (FIG. 2) may be received at a material handling facility or it may be necessary to assign the shipment 103 for transit on a delivery vehicle. Alternatively, a periodic timer may have expired, or a projected delivery time 260 (FIG. 2) may have changed.

In box 606, the carrier system 272 obtains a translation of a destination identifier 230 (FIG. 2) into a shipping address 242 (FIG. 2) from the destination identifier translation application 224. In box 609, the carrier system 272 determines whether the shipping address 242 has changed from a previous shipping address 242 associated with the shipment 103. If the shipping address 242 has not changed, the portion of the carrier system 272 ends.

If the shipping address 242 has changed, the carrier system 272 determines whether to initiate a rerouting of the shipment 103 in box 612. If it is determined not to reroute the shipment, the carrier system 272 notifies the sender and/or recipient in box 615 that the shipment 103 will not be rerouted. If the shipment 103 is to be rerouted, the carrier system 272 initiates one or more actions to facilitate rerouting of the shipment 103. For example, the carrier system 272 may send a message to a delivery vehicle driver informing him or her than the shipment 103 is not to be delivered to a previously determined geographic location. It may be the case that neither of the previously assigned shipping address 242 nor the updated shipping address 242 is applied to the exterior of the shipment 103. Thereafter, the portion of carrier system 272 ends.

Figure 7:
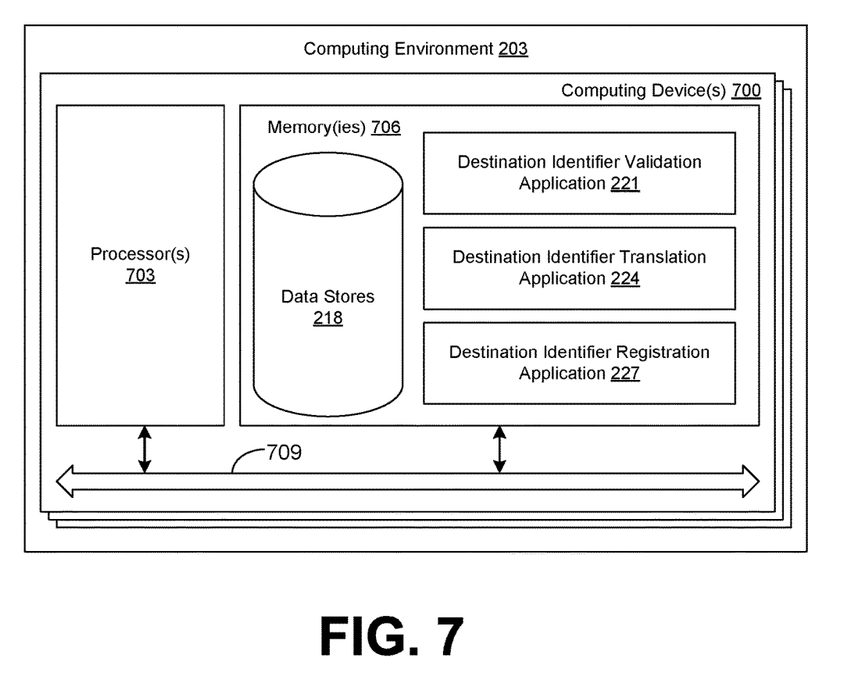
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the destination identifier validation application 221, the destination identifier translation application 224, the destination identifier registration application 227, and potentially other applications. Also stored in the memory 706 may be a data store 218 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the destination identifier validation application 221, the destination identifier translation application 224, the destination identifier registration application 227, the client applications 266 (FIG. 2), the carrier system(s) 272 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the destination identifier validation application 221, the destination identifier translation application 224, the destination identifier registration application 227, and the carrier system 272. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the destination identifier validation application 221, the destination identifier translation application 224, the destination identifier registration application 227, the client applications 266, and the carrier system(s) 272, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the destination identifier validation application 221, the destination identifier translation application 224, the destination identifier registration application 227, the client applications 266, and the carrier system(s) 272, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   initiate scanning of a destination identifier applied to an exterior of a shipment, the destination identifier corresponding to a globally unique character string that represents a specific recipient;
   perform a verification upon the destination identifier using a checksum portion of the destination identifier;
   determine a first projected delivery time for the shipment;
   translate the destination identifier to a first shipping address based at least in part on the first projected delivery time and a stored mapping of destination identifiers to shipping addresses;
   initiate a first action to route the shipment for delivery to the first shipping address;
   determine a second projected delivery time for the shipment;
   translate the destination identifier to a second shipping address based at least in part on the second projected delivery time and the stored mapping;
   automatically initiate a second action to reroute the shipment for delivery to the second shipping address; and
   wherein neither the first shipping address nor the second shipping address are applied to the exterior of the shipment.

2. The non-transitory computer-readable medium of claim 1, wherein when executed the program further causes the at least one computing device to at least:
   receive a user specification of the destination identifier; and
   determine whether the destination identifier is available for registration.

3. The non-transitory computer-readable medium of claim 1, wherein when executed the program further causes the at least one computing device to at least assign the globally unique character string to the recipient at least partly on a random basis.

4. A system, comprising:
   at least one computing device; and
   at least one application executable in the at least one computing device, wherein when executed the at least one application causes the at least one computing device to at least:
      initiate scanning of a destination identifier applied to a shipment;
      translate the destination identifier to a first shipping address based at least in part on a mapping of destination identifiers to shipping addresses;

initiate a first action to route the shipment for delivery to the first shipping address;

translate the destination identifier to a second shipping address based at least in part on the mapping, wherein the destination identifier is translated to the second shipping address instead of the first shipping address based at least in part on a change in a projected delivery time for the shipment; and automatically initiate a second action to reroute the shipment for delivery to the second shipping address.

5. The system of claim 4, wherein neither the first shipping address nor the second shipping address are applied to an exterior of the shipment.

6. The system of claim 4, wherein when executed the at least one application further causes the at least one computing device to at least perform a verification upon the destination identifier.

7. The system of claim 4, wherein the destination identifier corresponds to a globally unique character string that represents a specific recipient.

8. The system of claim 4, wherein the destination identifier is applied to an exterior of the shipment.

9. The system of claim 4, wherein the destination identifier is translated to the second shipping address based at least in part on rerouting configuration data indicating that rerouting the shipment to the second shipping address instead of the first shipping address meets at least one of: a cost tolerance criterion or a delivery time tolerance criterion.

10. The system of claim 4, wherein the destination identifier excludes any personally identifiable information.

11. The system of claim 4, wherein the second action comprises sending a message to a delivery vehicle driver indicating that the shipment is not to be delivered to the first shipping address.

12. A method, comprising:
scanning, in a first instance, by at least one computing device, a destination identifier applied to a shipment;

translating, by the at least one computing device, the destination identifier to a first shipping address based at least in part on a mapping of destination identifiers to shipping addresses in response to the first instance of scanning;

initiating, by the at least one computing device, a first action to route the shipment for delivery to the first shipping address;

scanning, in a second instance, by the at least one computing device, the destination identifier applied to the shipment;

translating, by the at least one computing device, the destination identifier to a second shipping address based at least in part on the mapping in response to the second instance of scanning, wherein the destination identifier is translated to the second shipping address instead of the first shipping address based at least in part on a change in a projected delivery time for the shipment; and automatically initiating, by the at least one computing device, a second action to reroute the shipment for delivery to the second shipping address.

13. The method of claim 12, wherein the destination identifier is applied to an exterior of the shipment, and neither of the first shipping address or the second shipping address are on the exterior of the shipment.

14. The method of claim 12, further comprising:
determining, by the at least one computing device, that the projected delivery time for the shipment to the first shipping address has changed beyond a threshold; and
updating, by the at least one computing device, the mapping to map the destination identifier to the second shipping address instead of the first shipping address.

15. The method of claim 12, further comprising:
determining, by the at least one computing device, that a location of a recipient of the shipment has changed; and
updating, by the at least one computing device, the mapping to map the destination identifier to the second shipping address instead of the first shipping address.

16. The method of claim 12, wherein the destination identifier includes a user-specified string that is uniquely registered to a single recipient.

17. The method of claim 16, wherein the destination identifier further includes a checksum or a hash.

18. The method of claim 12, further comprising causing, by the at least one computing device, the second shipping address to be rendered on a display of a client device.

19. The method of claim 12, wherein the destination identifier is translated based at least in part on a characteristic of the shipment, and the characteristic comprises at least one of: a size of the shipment, a weight of the shipment, a value of the shipment, or a fragility of the shipment.

20. The system of claim 4, wherein the destination identifier corresponds to a user-specified string.

\* \* \* \* \*